United States Patent [19]

Kim et al.

[11] Patent Number: 5,061,301
[45] Date of Patent: Oct. 29, 1991

[54] PROCESS FOR THE PREPARATION OF SURFACE MODIFIED, MULTILAYERED, COMPOSITE MEMBRANES FOR OXYGEN ENRICHMENT AND THE GAS SEPARATION MEMBRANES

[75] Inventors: Un Y. Kim; Yong S. Kang; Jae J. Kim; Sung W. Song; Hyun C. Park, all of Seoul, Rep. of Korea

[73] Assignee: Korea Institute of Science and Technology, Seoul, Rep. of Korea

[21] Appl. No.: 574,129

[22] Filed: Aug. 29, 1990

[30] Foreign Application Priority Data

Nov. 11, 1989 [KR] Rep. of Korea ............ 89-16350

[51] Int. Cl.⁵ ............... B01D 53/22; B01D 71/68
[52] U.S. Cl. ............................ 55/158; 55/16; 210/500.41
[58] Field of Search ............... 55/16, 68, 158; 210/500.41

[56] References Cited

U.S. PATENT DOCUMENTS

| | | | |
|---|---|---|---|
| 3,709,841 | 1/1973 | Quentin | 210/500.41 X |
| 4,214,020 | 7/1980 | Ward et al. | 55/16 X |
| 4,230,463 | 10/1980 | Henis et al. | 55/68 X |
| 4,243,701 | 1/1981 | Riley et al. | 55/158 X |
| 4,413,106 | 11/1983 | Coplan et al. | 525/534 |
| 4,427,419 | 1/1984 | Li | 55/16 |
| 4,444,662 | 4/1984 | Conover | 55/16 X |
| 4,508,852 | 4/1985 | Bikson et al. | 521/27 |
| 4,602,922 | 7/1986 | Cabasso et al. | 55/158 |
| 4,689,267 | 8/1987 | Takamizawa et al. | 55/158 X |
| 4,696,686 | 9/1987 | Usami et al. | 55/158 |
| 4,751,104 | 6/1988 | Kulprathipanja et al. | 210/500.41 X |
| 4,767,422 | 8/1988 | Bikson et al. | 55/16 |
| 4,776,936 | 10/1988 | Smith et al. | 55/16 X |
| 4,781,733 | 11/1988 | Babcock et al. | 55/16 |
| 4,826,599 | 5/1989 | Bikson et al. | 55/16 X |
| 4,919,694 | 4/1990 | Hata et al. | 55/158 |
| 4,954,143 | 9/1990 | Scott et al. | 55/16 |
| 4,971,695 | 11/1990 | Kawakami et al. | 55/16 X |
| 4,981,498 | 1/1991 | Bikson et al. | 55/16 |

Primary Examiner—Robert Spitzer
Attorney, Agent, or Firm—Oblon, Spivak, McClelland, Maier & Neustadt

[57] ABSTRACT

A process for the preparation of surface modified, multilayered, composite membranes are disclosed. This process comprises the steps of: subjecting the surface of porous polysulfone membranes to sulfonation to introduce sulfonic acid functional groups onto the surface of the membranes; and either subjecting the sulfonic acid functional groups so introduced to silylation with reactive polysiloxanes to undergo grafting the polysiloxanes on the introduced functional groups, followed by applying polysiloxanes coating along with cross-linking agent onto so treated membranes to allow to undergo cross-linking; or carrying out both the silylation step and the coating and cross-linking step simultaneously.

The membranes so produced are useful in gas separation systems for oxygen enrichment of air.

8 Claims, 1 Drawing Sheet

PROCESS FOR THE PREPARATION OF SURFACE MODIFIED, MULTILAYERED, COMPOSITE MEMBRANES FOR OXYGEN ENRICHMENT AND THE GAS SEPARATION MEMBRANES

BACKGROUND OF THE INVENTION

1. Field of the Invention

The present application relates to a new process for the preparation of multilayered, composite oxygen enrichment membranes for separating oxygen from air and gas separation membranes obtainable from the same process.

2. Background of the Prior Art

In non-porous polymer membranes, gases are dissolved at one surface of the membranes and, then, the gases so dissolved are diffused, depending on the concentration gradients thereof, to the opposite surface, at which the gases are permeated out. This phenomenon, known as the solution-diffusion mechanism, may be explained by Fick's first law as set forth below:

$$J = -D\left(\frac{\partial C}{\partial X}\right) \quad (1)$$

where J is the flux of the permeating gas per unit area; D is the diffusion coefficient; C is the concentration of the permeating gas inside the membrane; and X is the space coordinate indicating optional position inside the membrane.

The concentration, C, of permeating gas inside the membrance is proportional to the gas pressure, p. This phenomenon to which Henry's law is applied is expressed by the following equation:

$$C = Sp \quad (2)$$

where S is the solubility coefficient or the Henry's constant.

In a steady state, since the concentrations at both ends of the membranes becomes constant, the flux also become constant accordingly, and Equation (1) may be rewritten to give the following equation:

$$J = \frac{D(C_1 - C_2)}{L} \quad (3)$$

where $C_1$ and $C_2$ are the concentrations of a permeating gas at high and low pressure sides of a given membrane, respectively, and L is the thickness of the membrane.

Equations (2) and (3) may be combined to give the following equation:

$$J = \frac{DS(P_1 - P_2)}{L} = \frac{\bar{P}(P_1 - P_2)}{L} \quad (4)$$

where $\bar{P}$ is defined as DS, which represents the permeability coefficient.

Another measure for the indication of gas permeation properties of membranes, in addition to the permeability coefficients, is the selectivity of membranes. The selectivity of membranes to component a from component b among a gas mixture consisting of components a and b is defined by the ratio of the permeability coefficient of component a to that of component b. This ratio is referred to as the ideal separation factor, Aab, and is defined by the following equation:

$$Aab = \frac{\bar{P}a}{\bar{P}b} = \frac{(Da/Db)}{(Sa/Sb)} \quad (5)$$

$\bar{P}a$ and Aas are the constant values indicating intrinsic attributes of the materials from which the membranes are made, and are not influenced by methods for the production thereof. Given the materials for separation membranes, the selectivity becomes constant. Since the flux is inversely proportional to the thickness of membranes, it may be increased by reducing the thickness of the active layer of membranes. The thin membranes lack mechanical strength and, thus, it is necessary to use a supporting layer in order to compensate for the lack of the mechanical strength. In this purport, the composite membranes have been suggested which are produced by coating a material having good permeation properties on a porous supporting layer having good mechanical strength. Since the composite membranes are excellent in both the permeation properties and the mechanical strength, almost all of the separation membranes currently used adopt such composite membranes.

In many cases, the porous supporting layer of the composite membranes acts as a mechanical supporter, but occasionally it constitutes an active layer at which separation can occur. In the case of composite membranes, because it is difficult to measure the thickness of active layer, a new permeability is established and commonly used. The permeability, P, is defined by the following equation:

$$\bar{P} = P/L \quad (6)$$

Equations (4) and (6) are combined to give the following equation:

$$J = P(p_1 - p_2) \quad (7)$$

As explained hereinbefore, the permeation property of composite membranes is usually represented by the permeability, P, and the ideal separation factor, Aab.

Heretofore, a number of patent applications relating to the production of composite membranes have been filed since such membranes are excellent in terms of both the permeation property and the mechanical strength.

For example, Henis et. al. U.S. Pat. No. 4,230,463 and Korean Patent Application No. 0171/1982 disclose a method for the preparation of multicomponent, composite membranes which are superior in both the permeability and the selectivity. According to this method, the membranes are produced by plugging pores on the surface of hollow fiber membranes made of polysulfones with silicon rubbers having good gas permeability. To yield composite membranes, a method is featured which applies a vacuum onto the inner surface of porous, hollow fiber polysulfone membranes so as to cause an occluding contact of silicon rubber with the polysulfone membranes. In this method, the size and the number of skin pores of the porous, hollow fiber polysulfone membranes should be exceedingly small in order to give composite membranes having excellent permeability and selectivity.

Riley et al. U.S. Pat. No. 4,243,701 teaches a process for the preparation of gas separation membranes, which comprises coating a silicon rubber solution having good permeability onto the surface of cellulose acetate or polysulfone membranes. The produced membranes have good permeability, but its selectivity is not high.

Cabasso et al. U.S. Pat. No. 4,602,922 teaches a process for the preparation of composite membranes, which comprises coating a silicon rubber solution having good permeability onto the surface of porous polysulfone membranes in the same manner as in U.S. Patent No. 4,243,701 to Riley, and further coating a modified polyphenylene oxide having good selectivity onto the above silicon rubber coating to give a composite thin membrane. However, this method comprising two steps of coating is not only inconvenient but also lowers the permeability.

SUMMARY OF THE INVENTION

An object of the present invention is to provide a new process for the preparation of multilayered, composite oxygen enrichment membranes which overcome the disadvantages encountered in the aforementioned prior art methods.

Another object of the present invention is to provide a new process for the preparation of multilayered, composite separation membranes having excellent permeability and selectivity, in which process no accurate regulation of the size and the number of pores on the surface of polysulfone membranes is needed in order to increase the permeability and selectivity.

A still further object of the present invention is to provide gas separation membranes having both excellent permeability and selectivity.

These and other objects of the invention can be achieved by the process of the present invention, which comprises the steps of:

subjecting the surface of porous polysulfone membranes to sulfonation to introduce sulfonic acid functional groups into the surface; and either subjecting the sulfonic acid functional groups so introduced to reaction with reactive polysiloxanes to undergo grafting said polysiloxanes, followed by applying polysiloxanes for coating along with cross-linking agents onto membranes so treated to allow to undergo cross-linking; or carrying out both the silylation step and the coating and cross-linking step simultaneously.

DESCRIPTION OF THE DRAWING

The objects of the present invention will become apparent by referring to the illustration provided in the drawing.

The accompanying figure is a cross-sectional view of an embodiment of surface modified, multilayered, composite oxygen enrichment membranes.

Figure 1:
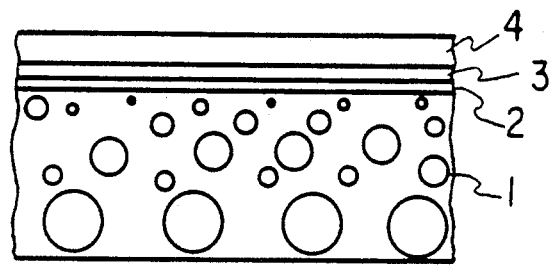

According to the figure, the oxygen enrichment membrane consists of, from the bottom, a porous polysulfone layer 1, a sulfonated polysulfone layer 2, a polysiloxane grafted layer formed by grafting polysiloxanes to sulfone groups 3, and a silicon rubber layer formed by coating and cross-linking polysiloxanes 4.

DETAILED DESCRIPTION OF THE INVENTION

The polysulfones are used in various kinds of separation membranes since they possess good permeability and film formability. Useful polysulfones are commercially available under trade names such as "P-1700" and "P-3500" from Union Carbide Corporation, U.S.A., both commercial products having the following formula:

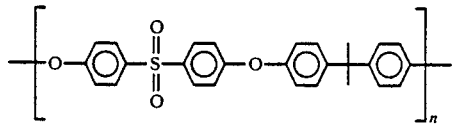

where n represents the degree of polymerization and is within about 50 to 80. Polyether sulfones having the following formula:

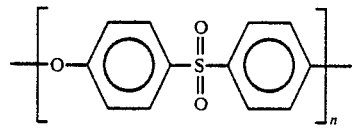

and available under trade name "Victrex" from ICI, Ltd., Great Britain, are also useful.

The above exemplified polysulfones or polyether sulfones are dissolved in a solvent such as dimethylformamide, dimethylacetamide and N-methylpyrrolidone, and an additive such as polyvinylpyrrolidone, methyl cellosolve and isopropyl alcohol is added thereto to give a solution, which is coagulated with a coagulant such as water and a saline solution to give the porous polysulfone membranes of the present invention.

According to the present invention, the surface of porous polysulfone membranes is chemically modified by means of sulfonation. At this time, physical modification, such as swelling, of the surface is also carried out by the solvent and/or reactants; thereby the size and number of pores on the surface of the porous polysulfone membranes become reduced. The surface of the porous polysulfone membranes to which functional groups have been introduced is subjected to silylation with reactive polysiloxanes. Since the surface thus treated is similar to silicon rubber coatings, the energy difference of the surface at the interface becomes reduced, and it is possible to coat the silicon rubber layer as a thinner film.

In the process of the present invention, since both the chemical and physical modifications are effected, neither the occluding contact utilized in, for example, U.S. Pat. No. 4,230,463 and Korean Patent Application No. 0171/1982, nor the accurate regulation of the pore size on the surface of polysulfone membranes is needed in order to produce separation membranes having high permeability and high selectivity. In addition, since the process of the present invention utilizes chemical modification, it is possible to produce multicomponent, multilayered oxygen enrichment membranes having far better oxygen selectivity than that of U.S. Pat. No. 4,243,701.

A process for the preparation of sulfonated polysulfones is disclosed in U.S. Pat. No. 3,709,841. This process utilizes chlorosulfonic acid or sulfur trioxide as a sulfonating agent to give sulfonated polyarylether sulfones which are advantageous in the utility of reverse osmosis membranes. Additionally, U.S. Pat. Nos. 4,413,106 and 4,508,852 disclose a process for the preparation of sulfonated polysulfone membranes, which process comprises dissolving polysulfones in a solvent and sulfonating the resulting solution with chlorosulfonic acid or sulfur trioxide to give homogeneous sulfonated polysulfones, followed by casting the sulfonated polysulfones to give membranes. In this process, sulfur trioxide is used in a complex form with triethylphosphate since it is very unstable in air.

In contrast to the processes taught in U.S. Pat. Nos. 4,413,106 and 4,508,852 in which polysulfones are sulfonated, in a solution form, with a sulfonating agent, the present invention adopts a surface modification technique, which comprises first casting polysulfones to give porous polysulfone membranes, and then sulfonating only the surface of the resulting membranes with a sulfonating agent such as chlorosulfonic acid or a complex of sulfur trioxide with triethylphosphate. The sulfonation may be carried out at a reaction temperature of $-20°$ C. to $120°$ C. for a reaction period of time of from few seconds to 2 hrs. It is very important in the sulfonation to choose a suitable solvent capable of properly swelling the polysulfone membranes to regulate the size of pores. Also, the solvent should be non-reactive with the sulfonating agent. The suitable solvents include aliphatic- or cyclo-alkanes such as pentane and cyclohexane, halogenated alkanes, dialkyl ethers, and mixtures thereof.

The surface of the sulfonated polysulfone membranes thus treated is subjected to silylation to make its surface energy similar to that of silicon rubber coatings which are produced by cross-linking polysiloxane coating solutions. This surface treatment makes it possible to apply polysiloxane coatings on the surface of the sulfonated polysulfone membranes in the form of a thin film.

The reactive polysiloxanes used in the silylation should have at least one functional group, per molecule, capable of reacting with sulfonic acids, and may be represented by the genereal formula:

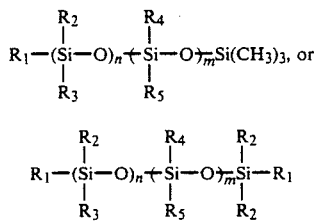

where $R_1$ is HO, Cl, Br, $CH_2=CH$, H or $H_2N(C_2)_x$ [wherein x is 0 to 10]; $R_2$, $R_3$, $R_4$ and $R_5$ are $CH_3$ or $C_6H_5$, respectively; and n and m are 0 to 5,000. The reactive polysiloxane may be in the form of a straight or branched chain.

The above reactive polysiloxanes are dissolved in a solvent such as cyclohexane to give a 0.5 to 5.0% by weight solution, which is contacted with the sulfonated polysulfone membranes to allow silylation. This reaction may be effected at a temperature of $20°$ C. to $50°$ C. for a period of from 1 min. to 2 hrs. The selection of the solvent to be used in the silylation is very important as in the sulfonation, because the solvent should swell the sulfonated polysulfone membranes to regulate the size of pores at the time of effecting the silylation. Useful solvents include aliphatic- or cyclo-alkanes such as pentane and cyclohexane, halogenated alkanes, dialkyl ethers, and mixtures thereof.

Onto the above treated polysulfone membranes are applied polysiloxane coatings, resulting in the formation of multicomponent, multilayered, composite membranes. The polysiloxanes used in the coatings should have at least two functional groups, per molecule, capable of reacting with cross-linking agents. The polysiloxane preferably has a molecular weight of 1,000 to 15,000. Other polysiloxanes such as polydimethylsiloxane, polymethylphenylsiloxane, or polydiphenylsiloxane may also be used in the coatings. The polysiloxanes may have the general formula:

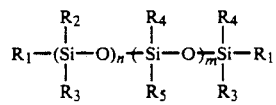

where $R_1$ is HO, Cl, Br, $CH_2=CH$, H or $H_2N(CH_2)_x$ [wherein x is 0 to 10]; $R_2$, $R_3$, $R_4$ and $R_5$ are $CH_3H$ or $C_6H_5$, respectively; and n and m are 0 to 5,000. The polysiloxanes may be in the form of a straight or branched chain.

The process of the present invention, in which the coating is performed after the silylation of the porous membranes surfaces, has an advantage that the thickness of silicon coatings may be easily reduced to 0.5 μm or below.

The cross-linking agents used in the coatings depend on the kind of functional groups of the polysiloxanes. When the functional groups, for example, are $R_1$ OH, the cross-linking agent may be selected from the group consisting of methyl or ethylacetoxytriacetate silane, silicon tetraacetate, tris(dimethylamino)methyl silane, and tris(cycloamino)methyl silane.

The solvent used may be selected from the group consisting of alkanes such as pentane and cyclohexane, halogenated alkanes, aliphatic alcohols such as methanol, dialkylethers, and mixtures thereof.

DESCRIPTION OF THE PREFERRED EMBODIMENT

The invention will be illustrated in greater detail by way of the following examples. The examples are presented for illustrative purposes and should not be construed as limiting the invention which is properly delineated in the claims.

EXAMPLE 1

1 g of a complex of sulfur trioxide with triethylphosphate was dissolved in 100 ml of cyclohexane. The resulting solution was contacted to the surface of porous polysulfone membranes for a sufficient period of time to give sulfonated polysulfone membranes. The membranes were washed three times with 100 ml of cyclohexane. The sulfonated polysulfone membranes were placed into a vacuum (10 torr) oven and dried for 3 hrs. 3 g of polydimethylsiloxane having silanol groups at both terminals (M.W.=77,000) was dissolved in 100 ml cyclohexane. The resultant solution was contacted to the surface of the above sulfonated polysulfone membranes and allowed to stand at room temperature for 2 hrs. The resulting membranes were washed three times with 100 ml of cyclohexane, and then dried in a vacuum (10 torr) over for 3 hrs. 1 g of polydimethylsiloxane having silanol groups at both terminals (M.W.=77,000) and 2 g of tris(dimethylamino)methylsilane were dissolved in 100 ml of cyclohexane to give a coating solution. The coating solution was coated onto the surface of the above treated membranes. The cross-linking was conducted at $130°$ C. for 30 min. to give a composite membrane.

The permeability and ideal separation factor to oxygen gas at various times for surface contacting between porous polysulfone membranes and sulfonating agents are listed in Table 1 below.

TABLE 1

Oxygen Gas Permeability at Various Surface Contact Times

| Contact Time (min.) | Oxygen Permeability ($PO_2$) | Ideal Separation Factor ($PO_2/PN_2$) |
| --- | --- | --- |
| 0.1 | 1.5 | 4.6 |
| 5.0 | 2.0 | 2.8 |
| 10.0 | 1.4 | 2.4 |
| 30.0 | 1.5 | 2.6 |

Note:
Unit of Oxygen Permeability = $cm^3 (STP)/cm^2 \cdot sec \cdot cmHg \times 10$ In order to determine the changes in the sizes of surface pores before and after the sulfonation, the permeation rates of polyethyleneglycols having different molecular weights were measured. The results are listed in Table 2 below.

TABLE 2

Permeation Rates of Polyethylene Glycols Having Different M.W.

| M.W. of Polyethylene Glycol | Permeation Rates before Sulfonation | Permeation Rates after Sulfonation |
| --- | --- | --- |
| 1540 | 0.85 | 0.45 |
| 7500 | 0.75 | 0.40 |
| 18500 | 0.20 | 0.13 |

Notes:
1. Unit of Permeation Rate = g/min. atm
2. Concentration of Polyethylene Glycol Used = 2000 ppm in aqueous solution.

EXAMPLE 2

1 g of a complex of sulfur trioxide with triethylphosphate was dissolved in 100 ml of cyclohexane. The resulting solution was contacted to the surface of the same polysulfone membranes as obtained in Example 1 at room temperature for 30 min., and then washed three times with 100 ml of cyclohexane. Both the silylation step and the coating and cross-linking step were carried out in the same manner as in Example 1. The permeability values at various concentrations of polysiloxane coated are listed in Table 3 below.

TABLE 3

Permeabilities at Various Concentrations of Polysiloxanes

| Concentrations of Polysiloxanes (Wt %) | Oxygen Permeability ($PO_2$) | Ideal Separation Factor ($PO_2/PN_2$) |
| --- | --- | --- |
| 0.5 | 2.1 | 3.0 |
| 1.0 | 2.0 | 4.6 |
| 1.5 | 1.8 | 3.4 |
| 3.0 | 2.0 | 2.8 |

EXAMPLE 3

1 g of a complex of sulfur trioxide with triethylphosphate was dissolved in 100 ml of cyclohexane. The resulting solution was contacted to the surface of the same polysulfone membranes as Example 1, and then washed three times with 100 ml of cyclohexane. Both the silylation step and the coating and cross-linking step were carried out in the same manner as in Example 1. The variation in oxygen permeability values in accordance with the molecular weight of polysiloxanes coated and the types of cross-linking agents are shown in Table 4 below.

TABLE 4

Oxygen Permeability Values

| Molecular Weight | Oxygen Permeability ($PO_2$) | Ideal Separation Factor ($PO_2/PN_2$) | Cross-linking Agent |
| --- | --- | --- | --- |
| 26,000 | 1.3 | 5.1 | methylacetoxytriacetate silane |
| 36,000 | 3.3 | 3.7 | ethylacetoxytriacetate silane |
| 77,000 | 1.5 | 2.6 | tris(dimethylamino)methylsilane |
| 150,000 | 0.7 | 5.1 | tris(cycloamino)methylsilane |

EXAMPLE 4

1 g of a complex of sulfur trioxide with triethylphosphate was dissolved in 100 ml of cyclohexane. The resulting solution was contacted to the surface of porous polysulfone membranes for 30 min., and then washed three times with 100 ml of cyclohexane. The resulting membranes were placed into a vacuum (10 torr) oven and dried for 3 hrs. Then, the silylation and the cross-linking reaction were carried out simultaneously. That is, 1 g of polydimethylsiloxane having silanol groups at both terminals (M.W.=77,000) and 2 g of tris(dimethylamino)methylsilane were dissolved in 100 ml of cyclohexane to give a coating solution. The coating solution was coated onto the surface of the above treated polysulfone membranes and allowed to react at 130° C. for 30 min. to give a composite membrane.

The oxygen permeability are listed in Table 5.

TABLE 5

Oxygen Permeabilities

| Oxygen Permeability ($PO_2$) | Ideal Separation Factor ($PO_2/PN_2$) |
| --- | --- |
| 0.8 | 5.1 |

EXAMPLE 5

A solution of 10 g of chlorosulfonic acid in 100 ml of dichloroethane was contacted to polysulfone membranes for 10 min. and then washed thrice with 100 ml of cyclohexane. The silylation and the silicon coating procedures were carried out in the same manner as in Example 1. The results are listed in Table 6.

TABLE 6

Oxygen Permeability Values at Various Concentrations of Polysiloxane Used

| Concentration (Wt %) | Oxygen Permeability ($PO_2$) | Ideal Separation Factor ($PO_2/PN_2$) |
| --- | --- | --- |
| 5.0 | 2.7 | 1.3 |
| 2.5 | 1.9 | 2.5 |
| 1.0 | 12.0 | 1.7 |

What is claimed is:

1. A surface modified, multilayered, composite membrane for the separation of air, comprising a porous polysulfone layer, a sulfonated polysulfone layer, a polysiloxane grafted layer and a silicon rubber layer.

2. A surface modified, multilayered, composite membrane for the separation of air, comprising:
   (a) a porous polysulfone layer;
   (b) a sulfonated polysulfone layer; and (c) a polysiloxane layer formed by grafting polysiloxanes onto said sulfonated polysulfone layer and cross-linking said polysiloxanes.

3. A process for the preparation of surface modified, multilayered, composite membranes for oxygen enrichment which comprises the steps of:

subjecting the surface of porous polysulfone membranes to sulfonation to introduce sulfonic acid functional groups onto the surface of the membranes; and either subjecting the sulfonic acid functional groups so introduced to silylation with reactive polysiloxanes to undergo grafting said polysiloxanes, followed by applying polysiloxanes for coating along with cross-linking agents onto so treated membranes to allow to undergo cross-linking; or carrying out both the silylation step and the coating and cross-linking step simultaneously.

4. The process according to claim 3, wherein the polysiloxanes for silylation and coating are polydimethylsiloxane having silanol groups at both terminals.

5. The process according to claim 4, wherein the polydimethylsiloxane having silanol groups at both terminals has a molecular weight within the range of 26,000 to 150,000 and is used in the form of a 0.05 to 5% by weight solution in cyclohexane.

6. The process according to claim 3, wherein the cross-linking agents are selected from the group consisting of tris(dimethylamino)methylsilane, tris(cycloamino)methylsilane, ethylacetoxytriacetate silane and methylacetoxytriacetate silane.

7. The process according to claim 3, wherein said sulfonation, silylation, and coating and cross-linking steps are conducted in a solvent.

8. The process according to claim 7, wherein the sulfonation is conducted with a complex of sulfur trioxide with triethylphosphate, and the solvent is cyclohexane, and the reaction time is within the range of from several seconds to 50 minutes.

* * * * *